US012532963B1

(12) United States Patent
Yuan

(10) Patent No.: US 12,532,963 B1
(45) Date of Patent: Jan. 27, 2026

(54) DETACHABLE AND COMBINABLE CABINET AND ITS ASSEMBLY METHOD

(71) Applicant: NINGBO ANSOL CABINET CO., LTD., Zhejiang (CN)

(72) Inventor: Limin Yuan, Zhejiang (CN)

( * ) Notice: Subject to any disclaimer, the term of this patent is extended or adjusted under 35 U.S.C. 154(b) by 0 days.

(21) Appl. No.: 19/079,937

(22) Filed: Mar. 14, 2025

(30) Foreign Application Priority Data

Nov. 15, 2024 (CN) ......................... 202411634729.4

(51) Int. Cl.

*A47B 47/00* (2006.01)
*A47B 47/03* (2006.01)
*A47B 87/02* (2006.01)
*A47B 96/14* (2006.01)
*F16B 12/02* (2006.01)

(52) U.S. Cl.

CPC ...... *A47B 47/0083* (2013.01); *A47B 47/0091* (2013.01); *A47B 47/03* (2013.01); *A47B 87/0215* (2013.01); *A47B 87/0276* (2013.01); *A47B 96/1466* (2013.01); *F16B 12/02* (2013.01)

(58) Field of Classification Search

CPC . A47B 47/0091; A47B 47/0083; A47B 47/05; A47B 47/03; A47B 47/0041; A47B 47/047; A47B 87/0284; A47B 87/0215; A47B 87/008; A47B 87/0276; A47B 87/0223; A47B 47/00; A47B 96/1466; F16B 12/02

See application file for complete search history.

(56) References Cited

U.S. PATENT DOCUMENTS 3,964,810 A * 6/1976 Murphy ................. A47B 47/04 312/265.2
4,265,501 A * 5/1981 Halliburton ............ A47B 43/00 312/258
4,419,938 A * 12/1983 Kaut ...................... A47B 47/05 108/190
6,185,878 B1 * 2/2001 Bullard, III ........... E04B 1/6179 312/265.5
10,321,761 B1 * 6/2019 Lai ..................... A47B 87/0223

(Continued)

FOREIGN PATENT DOCUMENTS

DE 20023103 U1 * 1/2003 ............. A47B 47/05
KR 2003066263 A * 8/2003

*Primary Examiner* — Kimberley S Wright

(57) ABSTRACT

A detachable and combinable cabinet and its assembly method comprises a combinable cabinet; the combinable cabinet includes a plurality of central unit cabinets, end unit cabinets, and connecting components used to assemble a plurality of central unit cabinets and end unit cabinets together; a plurality of the end unit cabinets are respectively positioned at top and bottom of the central unit cabinets; a modular design for the central unit cabinets and the end unit cabinets allows for the combination of units with relatively few specifications to create cabinets of various heights or widths, significantly simplifying the manufacturing process and greatly reducing storage and packaging volume, which facilitates storage, transportation, and protection, saving on shipping costs. It also provides an excellent solution for the production, packaging, and transportation of extra-long, extra-wide, and oversized cabinets. Additionally, it eliminates the need for extensive welding and grinding processes traditionally required in cabinet manufacturing.

9 Claims, 12 Drawing Sheets

(56) References Cited

U.S. PATENT DOCUMENTS

| | | | | |
|---|---|---|---|---|
| 2002/0166483 | A1* | 11/2002 | Alizade | E05G 1/024<br>109/78 |
| 2002/0171332 | A1* | 11/2002 | Skov | F16B 12/02<br>312/107 |
| 2005/0077806 | A1* | 4/2005 | Schellenberg | A23B 2/001<br>312/249.8 |
| 2008/0246375 | A1* | 10/2008 | Berg | A47B 47/0066<br>312/265.5 |
| 2009/0267463 | A1* | 10/2009 | Nilsson | A47B 47/0083<br>312/138.1 |
| 2016/0095430 | A1* | 4/2016 | Moyer | A47B 47/0091<br>211/188 |
| 2017/0164734 | A1* | 6/2017 | Steele | A47B 88/487 |
| 2018/0055219 | A1* | 3/2018 | Lim | A47B 47/0091 |
| 2018/0199708 | A1* | 7/2018 | Burnett | A47B 96/206 |
| 2019/0313790 | A1* | 10/2019 | Guizzardi | A47B 61/00 |
| 2020/0123824 | A1* | 4/2020 | Yang | A47B 87/0284 |
| 2020/0352326 | A1* | 11/2020 | Stearns | E04H 1/1244 |
| 2021/0394955 | A1* | 12/2021 | Leng | A47B 87/0284 |

* cited by examiner

DETACHABLE AND COMBINABLE CABINET AND ITS ASSEMBLY METHOD

1. TECHNICAL FIELD

The invention belongs to the technical field of cabinets, specifically relates to a detachable and combinable cabinet and its assembly method.

2. BACKGROUND ART

Cabinet is a kind of furniture with a specific height and function, usually used as a domestic or commercial storage of goods, the design of the cabinet can be simple or complex, mainly depends on its use and environment where it is placed; as people pay attention to the home environment and pursue quality of life, the function and design of the cabinet has been further developed and innovated; whether as storage furniture or decorative items, the cabinets play an important role in our life.

The large cabinets available on the market require substantial space during transportation, leading to high shipping costs and a significantly increased risk of damage due to bumps and knocks. Some cabinets with disassembly features offer limited functionality, lack modular assembly capabilities, and have exposed screws after assembly, which not only detracts from their aesthetic appeal but also results in suboptimal performance.

3. SUMMARY OF THE INVENTION

To achieve the aforementioned objectives, the present invention provides the following technical solution: a detachable and combinable cabinet and its assembly method, comprising a combinable cabinet; the combinable cabinet includes a plurality of central unit cabinets, end unit cabinets, and connecting components used to assemble a plurality of central unit cabinets and end unit cabinets together; a plurality of the end unit cabinets are respectively positioned at top and bottom of the central unit cabinets.

Each central unit cabinet comprises at least four first vertical profiles and three first side panels and a first door panel arranged between the four first vertical profiles.

Each end unit cabinet comprises at least four second vertical profiles and three second side panels and a second door panel arranged between the four second vertical profiles.

The first vertical profiles and the second vertical profiles are structurally identical, with grooves provided on all four sides of the first vertical profiles and the second vertical profiles.

The connecting components include profile connectors, a top panel, and a bottom panel; the top panel is positioned at a top of the combinable cabinet, and the bottom panel is positioned at a bottom of the combinable cabinet.

The profile connectors are used to connect the first vertical profiles and second vertical profiles, as well as to connect the second vertical profiles and the top panel.

As a preferred technical solution of the invention, the profile connectors have the same shape as the first vertical profiles but are slightly smaller in both length and width than the internal dimensions of the first vertical profiles; interior of the first vertical profiles and second vertical profiles are sleeved with the profile connectors, the profile connectors being screwed to the first vertical profiles and second vertical profiles.

As a preferred technical solution of the invention, a top, bottom, and both ends of each first side panel are equipped with first flanges, a top, bottom, and both ends of each second side panel are equipped with second flanges; the first flanges at both ends of the first side panels are respectively inserted into grooves of the first vertical profiles at both ends of the first side panels and secured with screws, the second flanges at both ends of the second side panels are respectively inserted into grooves of the second vertical profiles at both ends of the second side panels and secured with screws.

As a preferred technical solution of the invention, one end of the first door panel is hinged to one side of one of the first vertical profiles using a hinged part, one end of the second door panel is hinged to one side of one of the second vertical profiles using a hinged part, and the first door panel and second door panel are secured with screws.

As a preferred technical solution of the invention, both ends of the first door panel are equipped with first edges, top and bottom of the first door panel are equipped with first bends, the first edges at both ends of the first door panel are respectively inserted into grooves of the first vertical profiles at two ends of the first door panel; both ends of the second door panel are equipped with second edges, top and bottom of the second door panel are equipped with second bends, the second edges at both ends of the second door panel are respectively inserted into grooves of the second vertical profiles at two ends of the second door panel; the connection between the first door panel and second door panel is secured by fastening the first bends and second bends with screws.

As a preferred technical solution of the invention, four corners at a bottom of the top panel are welded with profile connectors; bottom ends of these profile connectors at the bottom of the top panel are inserted into an interior of uppermost second vertical profiles and secured with the second vertical profiles via screws; the top panel is also secured to a top of the uppermost second side panels with screws.

As a preferred technical solution of the invention, the bottom panel is secured to a bottom of lowermost second side panels with screws; four corners of the bottom panel are internally equipped with profile holes, and four profile holes align with bottom ends of four lowermost second vertical profiles.

As a preferred technical solution of the invention, the connecting components also include support feet and a door lock, the support feet have the same shape as the profile connectors; top ends of the support feet pass through the profile holes and extend into the second vertical profiles; two sides of each support foot are equipped with a plurality of height adjustment holes, the support feet are secured to the second vertical profiles with screws through these height adjustment holes; a bottom end of each support foot is fixed with a support plate.

As a preferred technical solution of the invention, the door lock includes latch components positioned on both sides of the first door panel and a latch control panel, as well as a latch slot on one side of the first side panel corresponding to a latch.

An assembly method for a detachable and combinable cabinet, comprising the following steps:

step 1: assembling the central unit cabinet: first, screw holes are drilled into the first flanges at both ends of the first side panels and into two grooves on the first vertical profiles facing an interior of the cabinet; then, the first side panels and the first vertical profiles are fixed together by inserting screws through the screw holes;

step 2: assembling the end unit cabinet: first, screw holes are drilled into the second flanges at both ends of the second side panels and into two grooves on the second vertical profiles facing the interior of the cabinet; then, the second side panels and the second vertical profiles are fixed together by inserting screws through the screw holes;

step 3: assembling an upper part of the combinable cabinet: screw holes corresponding to the first vertical profiles and second vertical profiles are drilled into the profile connectors; the profile connectors are inserted into the first vertical profiles of the central unit cabinet and the second vertical profiles of the end unit cabinet, and then fixed by inserting screws through the screw holes, completing the connection between the first vertical profiles and the second vertical profiles; next, screw holes are drilled into overlapping areas of the first side panels and the second side panels, and screws are inserted to secure them;

step 4: assembling a middle part of the combinable cabinet: four profile connectors are welded to the bottom of the top panel, and bottom ends of the profile connectors are inserted into the uppermost second vertical profiles and fixed with screws; screw holes are drilled into flanges at the bottom of the top panel, and the top panel is fixed to the top of the uppermost second side panel by inserting screws through screw holes; screw holes are drilled into flanges at a top of the bottom panel, and the bottom panel is fixed to the bottom of the lowermost second side panel by inserting screws through screw holes; support feet are installed inside the lowermost four second vertical profiles, and after adjusting height of the support feet, they are fixed to the second vertical profiles by inserting screws through the height adjustment holes.

step 5: assembling a lower part of the combinable cabinet: the first door panel and the second door panel are installed on corresponding positions of the central unit cabinet and the end unit cabinet using hinges; screw holes are drilled into overlapping areas of the first bends and second bends on the installed first door panel and second door panel, and screws are inserted to secure them; finally, the door lock is installed on the central unit cabinet.

Compared with the prior art, the invention provides a detachable and combinable cabinet and its assembly method, has the following advantages:

the detachable and combinable cabinet and its assembly method feature a modular design for the central unit cabinets and the end unit cabinets. This design allows for the combination of units with relatively few specifications to create cabinets of various heights or widths, significantly simplifying the manufacturing process and greatly reducing storage and packaging volume, which facilitates storage, transportation, and protection, saving on shipping costs. At the same time, it provides an excellent solution for the production, packaging, and transportation of extra-long, extra-wide, and oversized cabinets. Additionally, it eliminates the need for extensive welding and grinding processes traditionally required in cabinet manufacturing, protecting workers' health and the environment. This design offers strong practicality.

4. BRIEF DESCRIPTION OF ACCOMPANY DRAWINGS

Figure 1:
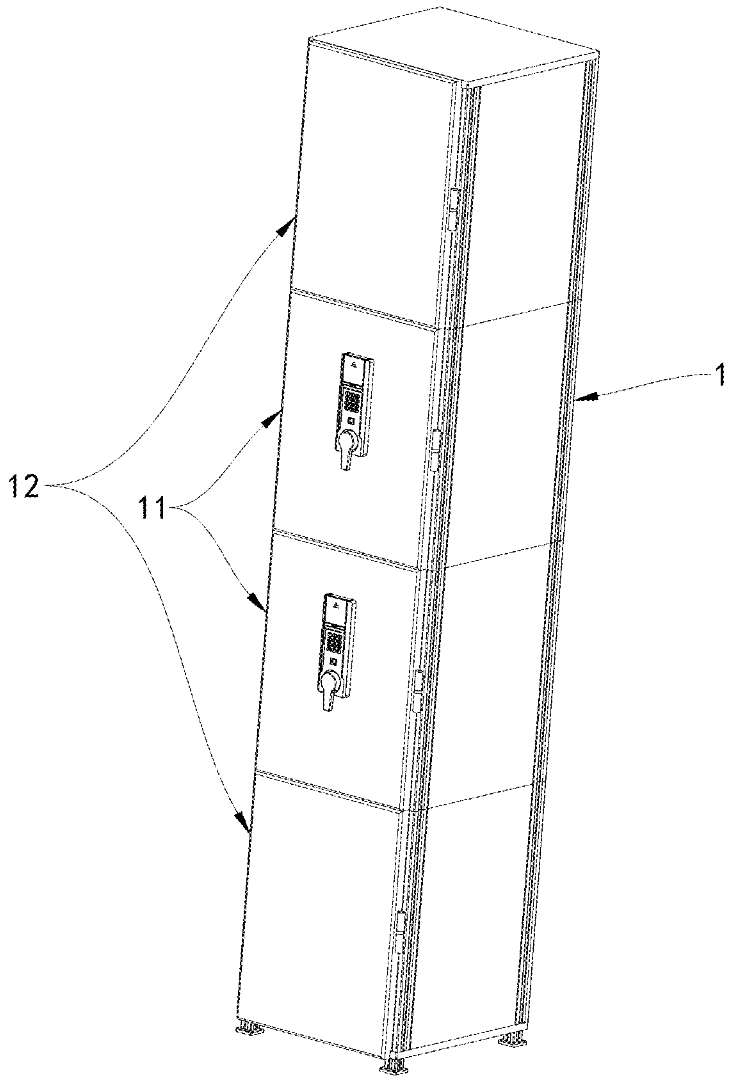
FIG. 1 is a schematic structural diagram of a detachable and combinable cabinet and its assembly method proposed by the invention.
Figure 2:
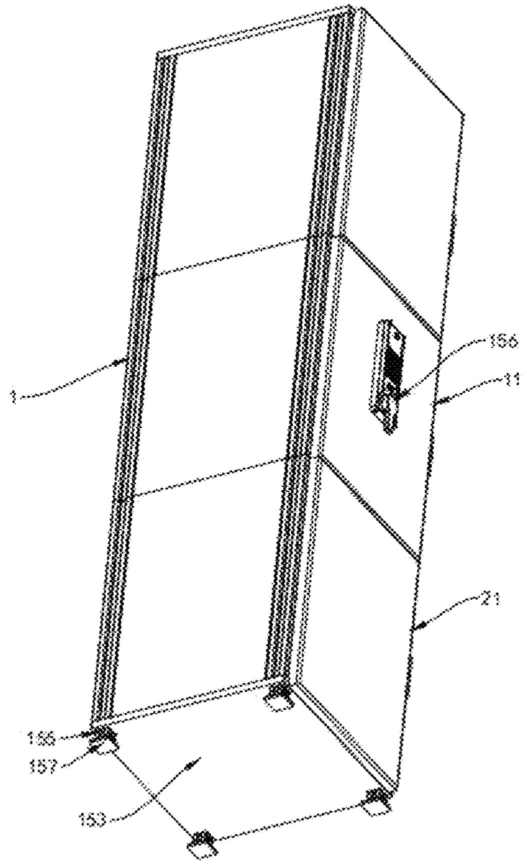
FIG. 2 is a schematic structural diagram of the bottom panel of the detachable and combinable cabinet and its assembly method proposed by the invention.
Figure 3:
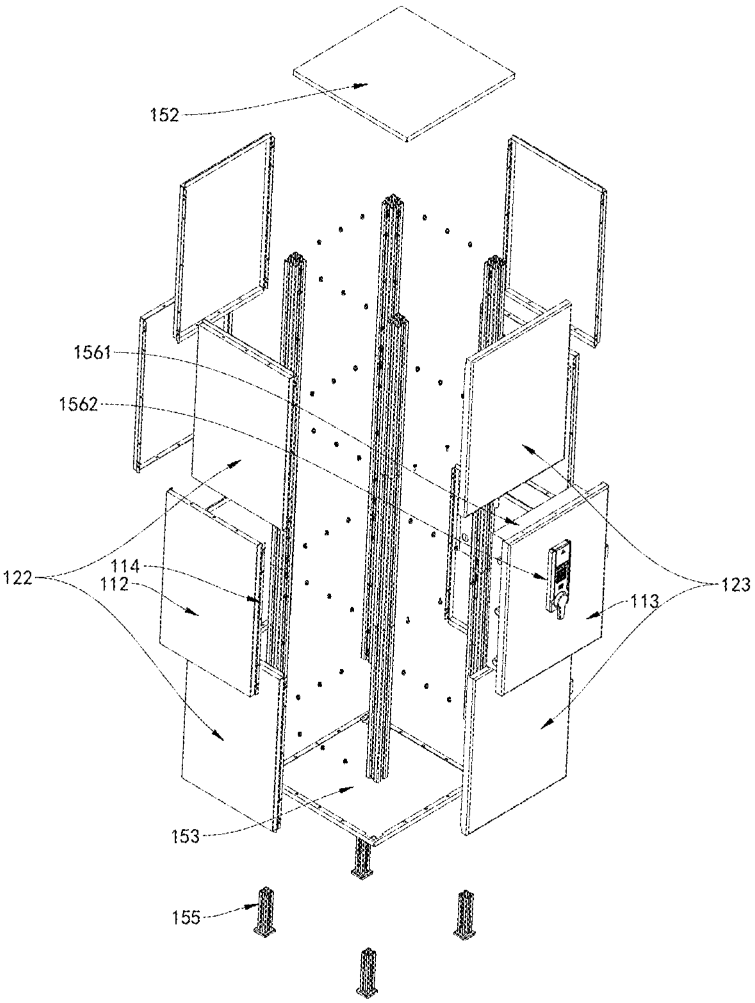
FIG. 3 is an exploded view of the structure of the detachable and combinable cabinet and its assembly method proposed by the invention.
Figure 4:
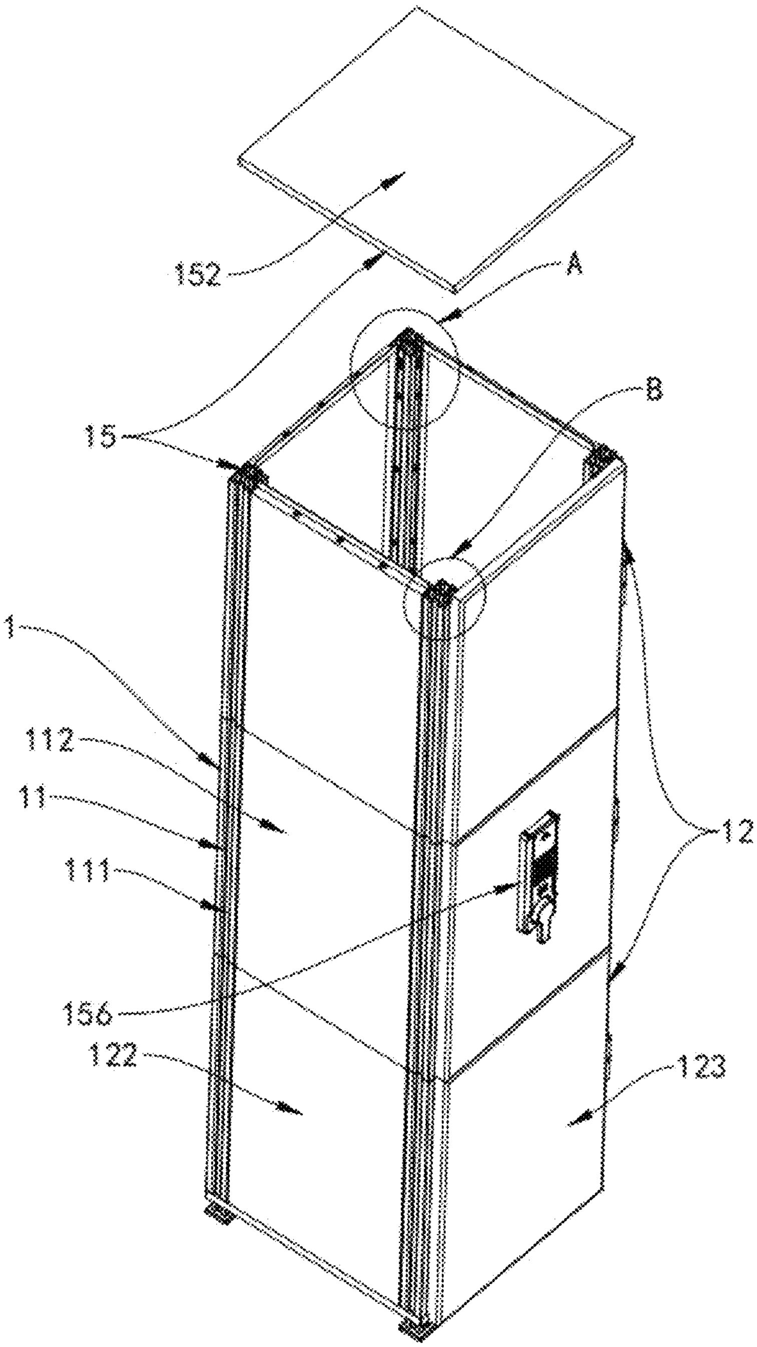
FIG. 4 is a schematic structural diagram of the top panel of the detachable and combinable cabinet and its assembly method proposed by the invention.

1 combinable cabinet, 11 central unit cabinet, 111 first vertical profile, 112 first side panel, 113 first door panel, 114 first flange, 115 first edge, 116 first bend, 12 end unit cabinet, 121 second vertical profile, 122 second side panel, 123 second door panel, 124 second flange, 125 second edge, 126 second bend, 13 groove, 14 hinged part, 15 connecting component, 151 profile connector, 152 top panel, 153 bottom panel, 154 profile hole, 155 support foot, 1551 height adjustment hole, 156 door lock, 1561 latch component, 1562 latch control panel, 1563 latch slot, 157 support plate.

5. SPECIFIC EMBODIMENT OF THE INVENTION

The technical scheme of the invention is further described clearly and detailedly hereinafter with reference to the drawings. Obviously, only partial embodiments of the invention are shown and the actual structure is not limited thereto. All other embodiments, which can be obtained by those skilled in the art without making any creative effort based on the embodiments in the present invention, shall all fall within the protective scope of the invention.

Referring to FIG. 1 to FIG. 12, a detachable and combinable cabinet and its assembly method, comprising a combinable cabinet 1; the combinable cabinet 1 includes a plurality of central unit cabinets 11, end unit cabinets 12, and connecting components 15 used to assemble a plurality of central unit cabinets 11 and end unit cabinets 12 together, a plurality of the end unit cabinets 12 are respectively positioned at top and bottom of the central unit cabinets 11; The end unit cabinet 12 may be zero or several in number. When there are zero end unit cabinets 12, the top panel 152 and the bottom panel 153 can be installed at the top and bottom of the central unit cabinet 11, respectively.

Each central unit cabinet 11 comprises at least four first vertical profiles 111 and three first side panels 112 and a first door panel 113 arranged between the four first vertical profiles 111.

Each end unit cabinet 12 comprises at least four second vertical profiles 121 and three second side panels 122 and a second door panel 123 arranged between the four second vertical profiles 121.

The first vertical profiles 111 and the second vertical profiles 121 are structurally identical, with grooves 13 provided on all four sides of the first vertical profiles 111 and the second vertical profiles 121.

The connecting components 15 include profile connectors 151, a top panel 152, and a bottom panel 153; the top panel 152 is positioned at a top of the combinable cabinet 1, and the bottom panel 153 is positioned at a bottom of the combinable cabinet 1.

The profile connectors 151 are used to connect the first vertical profiles 111 and second vertical profiles 121, as well as to connect the second vertical profiles 121 and the top panel 152.

As a preferred technical solution of the invention, the profile connectors 151 have the same shape as the first vertical profiles 111 but are slightly smaller in both length and width than the internal dimensions of the first vertical profiles 111; interior of the first vertical profiles 111 and second vertical profiles 121 are sleeved with the profile connectors 151, the profile connectors 151 being screwed to the first vertical profiles 111 and second vertical profiles 121.

In the embodiment, the profile connectors 151 have the same shape as the first vertical profiles 111 and the second vertical profiles 121, but is slightly smaller in size. When connecting the central unit cabinet 11 and the end unit cabinet 12, both ends of the profile connector 151 are inserted into the corresponding first vertical profile 111 and second vertical profile 121, respectively; screws are then inserted from an interior of the cabinet to secure the profile connectors 151 to the first vertical profiles 111 and the second vertical profiles 121; since the screws face the interior of the cabinet, they are not visible from an exterior of the central unit cabinet 11 and the end unit cabinet 12, resulting in a more aesthetically pleasing and streamlined appearance for the combinable cabinet 1.

As a preferred technical solution of the invention, a top, bottom, and both ends of each first side panel 112 are equipped with first flanges 114, a top, bottom, and both ends of each second side panel 122 are equipped with second flanges 124; the first flanges 114 at both ends of the first side panels 112 are respectively inserted into grooves 13 of the first vertical profiles 112 at both ends of the first side panels 112 and secured with screws, the second flanges 124 at both ends of the second side panels 122 are respectively inserted into grooves 13 of the second vertical profiles 121 at both ends of the second side panels 122 and secured with screws.

Figure 5:
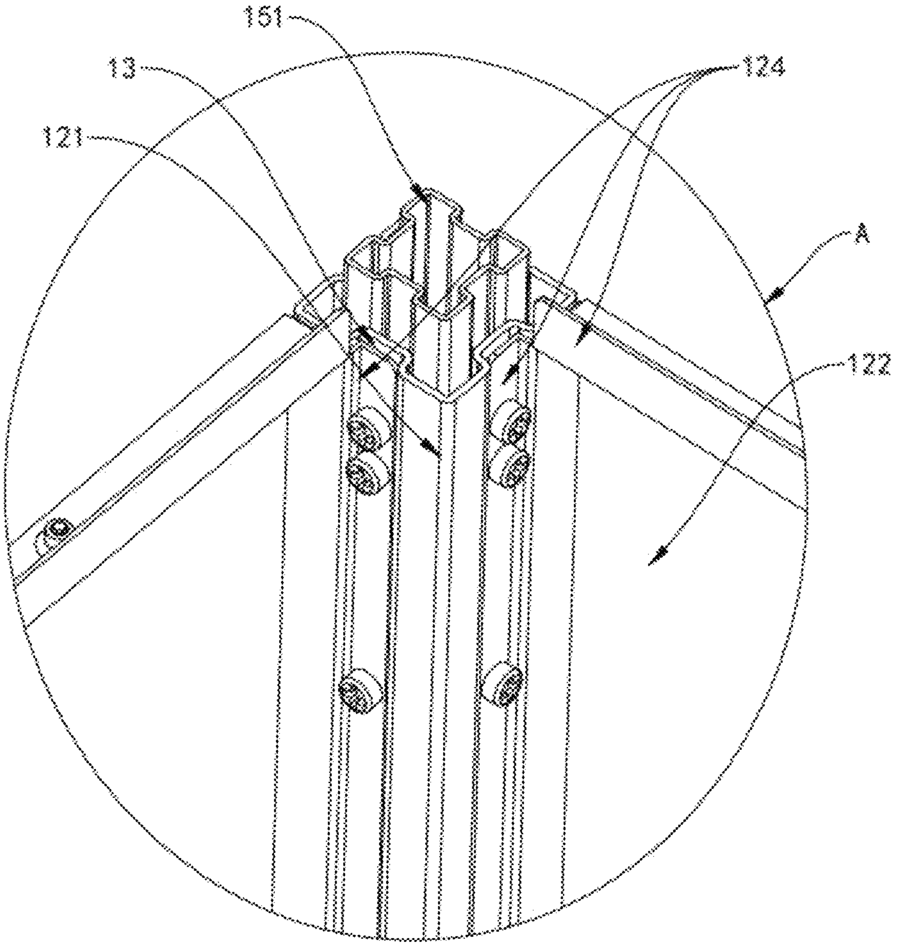
FIG. 5 is an enlarged view of the structure at position A in FIG. 4.
Figure 6:
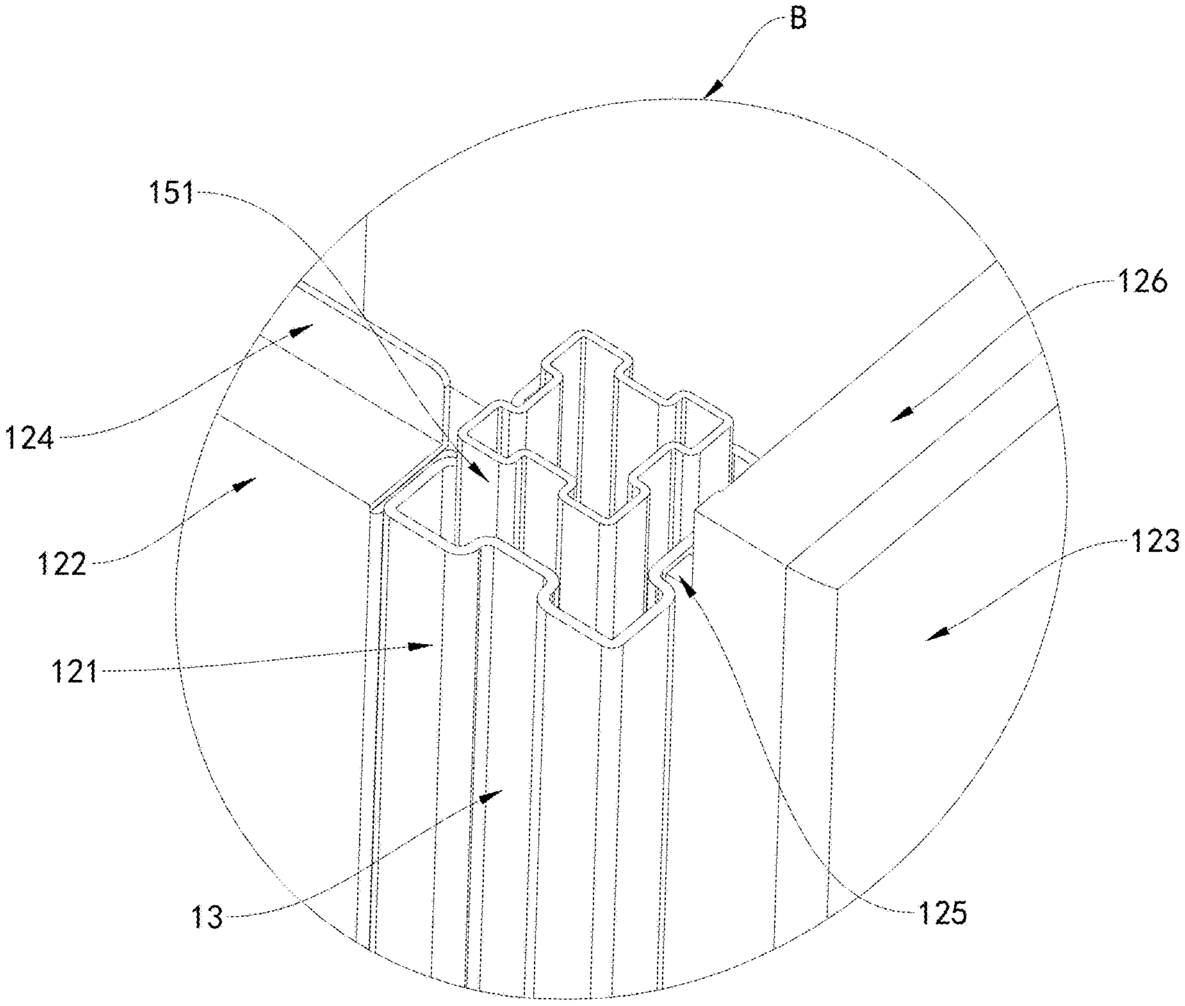
FIG. 6 is an enlarged view of the structure at position B in FIG. 4.
Figure 7:
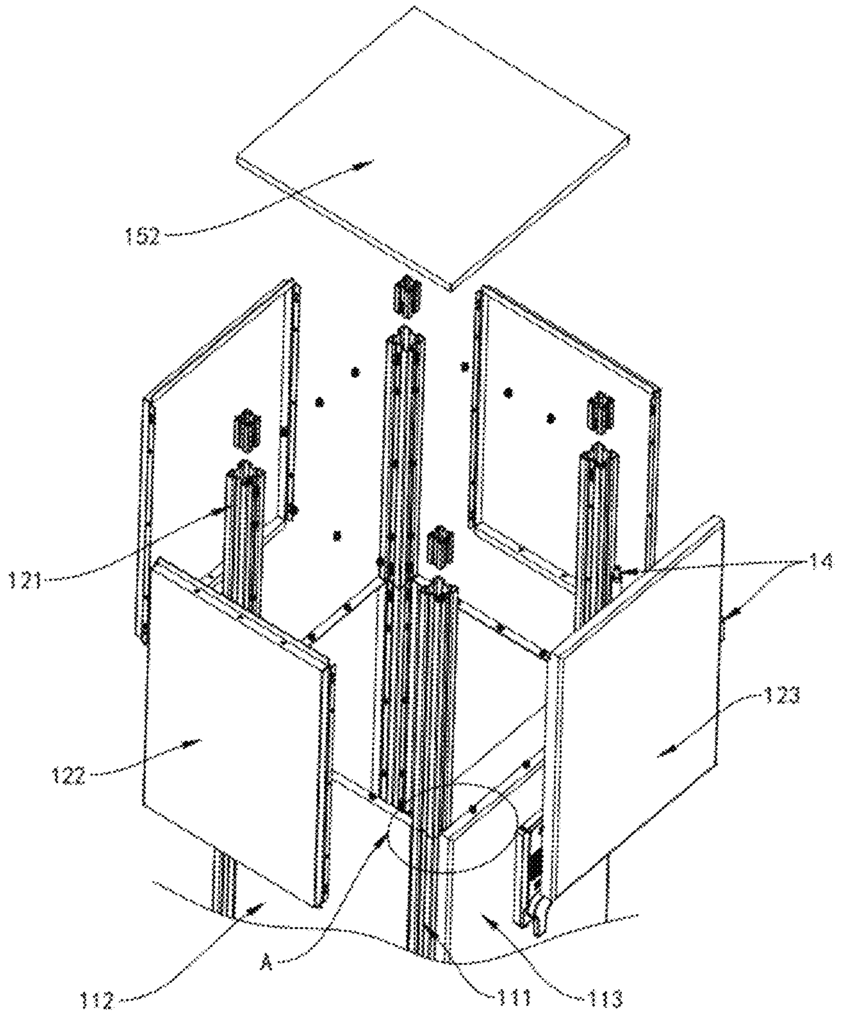
FIG. 7 is an exploded view of the structure of the end unit cabinet of the detachable and combinable cabinet and its assembly method proposed by the invention.
Figure 8:
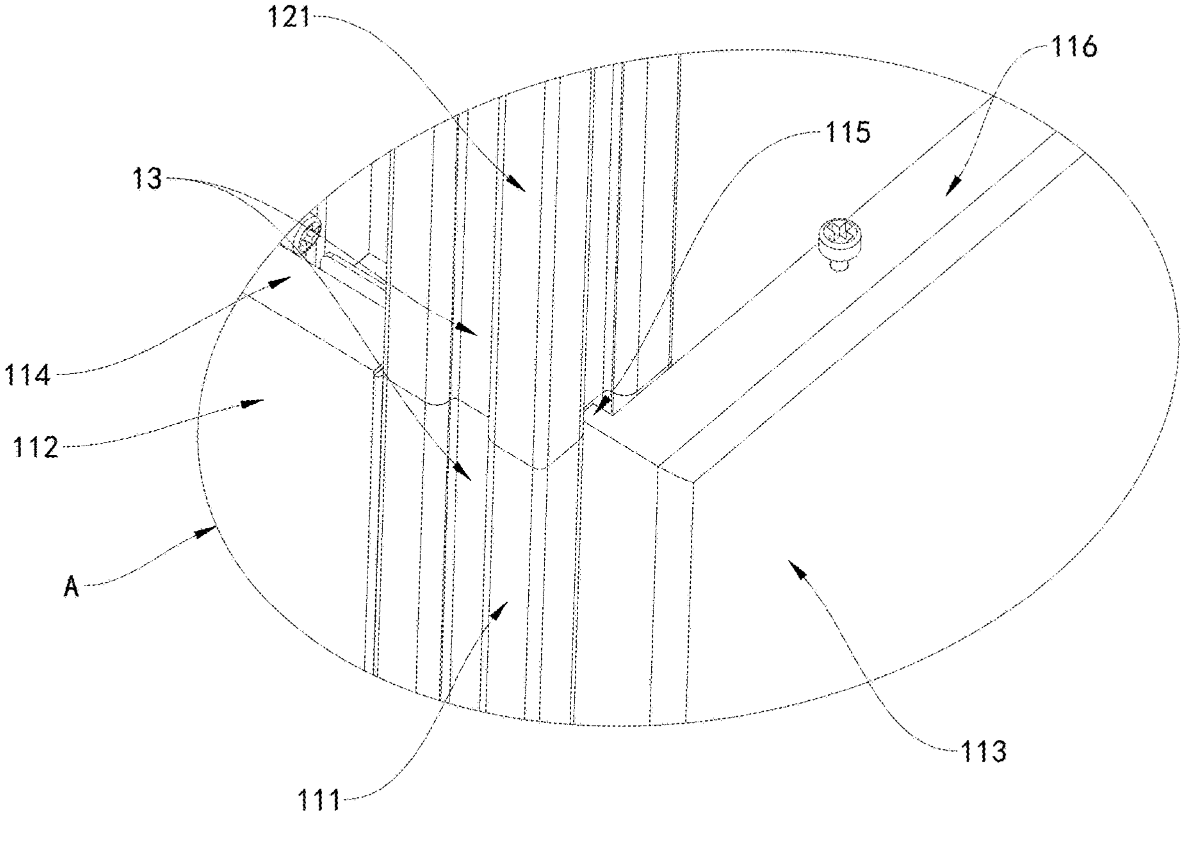
FIG. 8 is an enlarged view of the structure at position A in FIG. 7.
Figure 9:
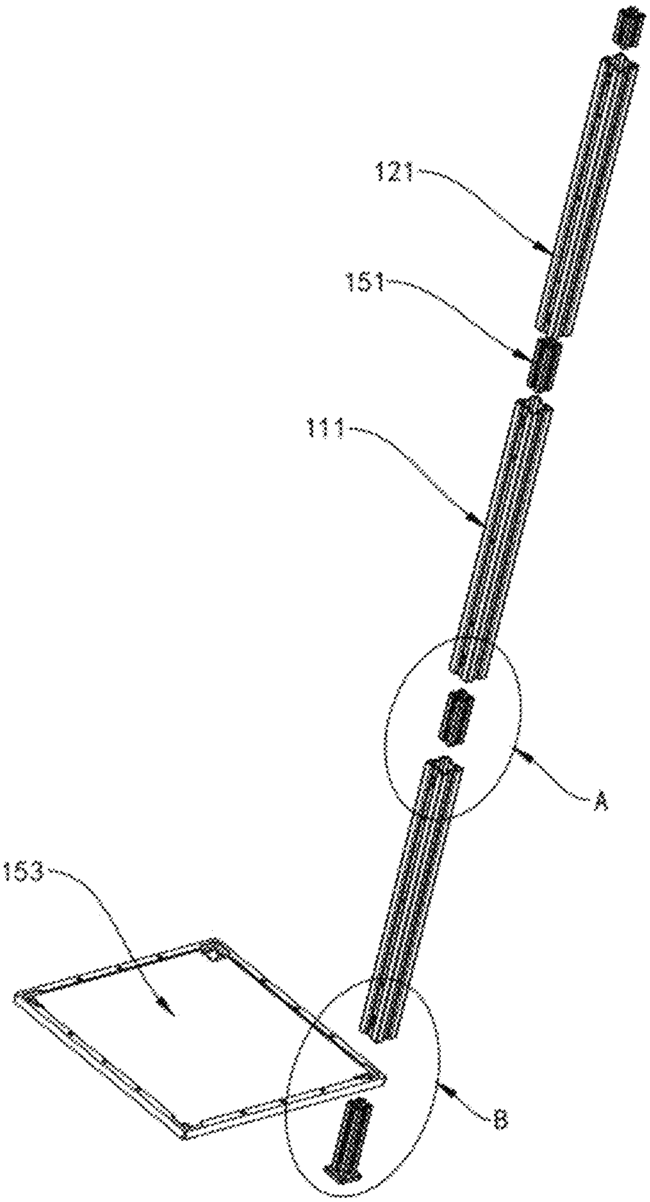
FIG. 9 is a schematic diagram showing the separated state of the first vertical profile and the second vertical profile of the detachable and combinable cabinet and its assembly method proposed by the invention.
Figure 10:
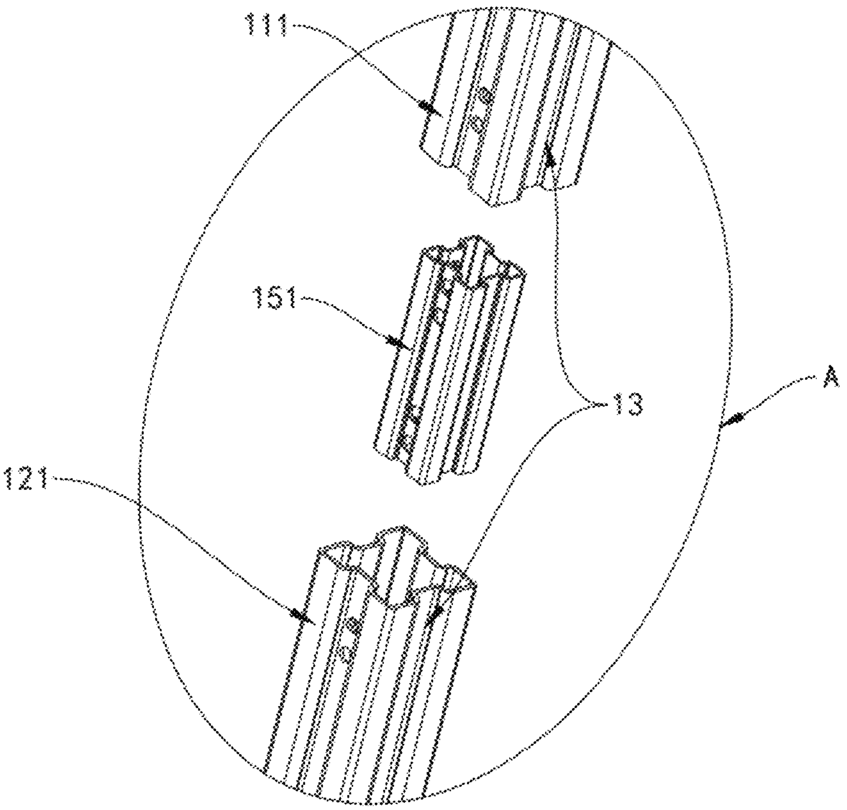
FIG. 10 is an enlarged view of the structure at position A in FIG. 9.
Figure 11:
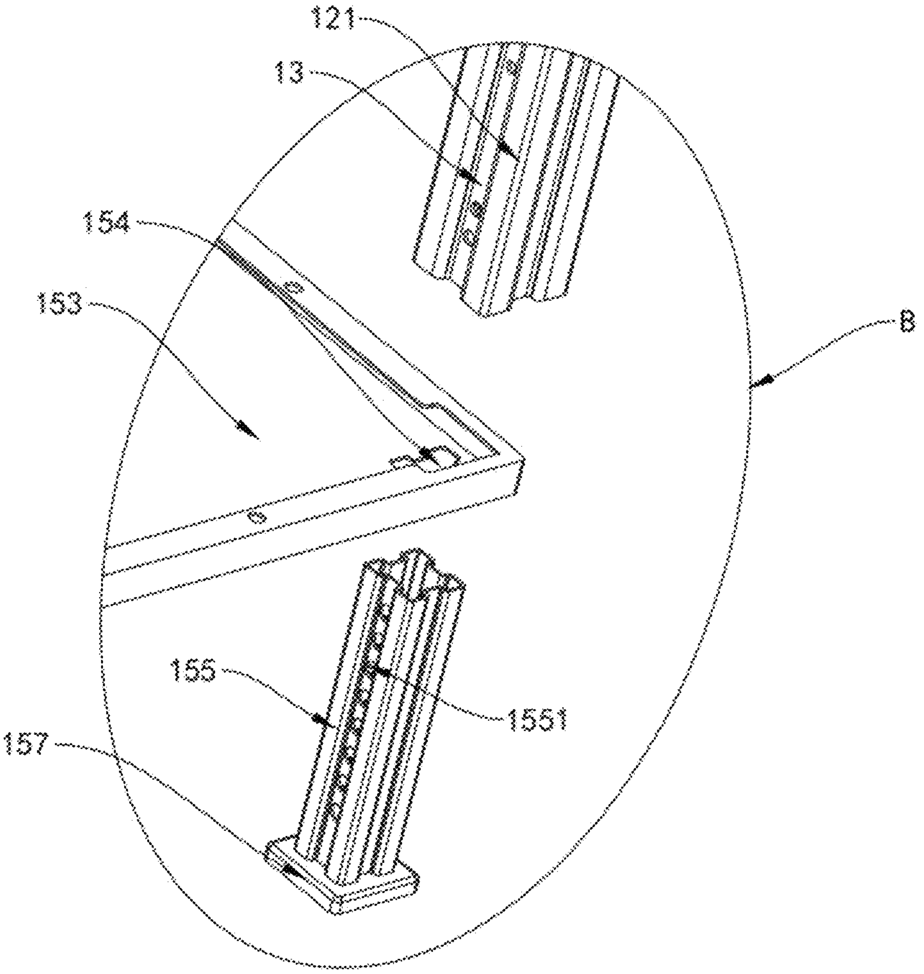
FIG. 11 is an enlarged view of the structure at position B in FIG. 9.
Figure 12:
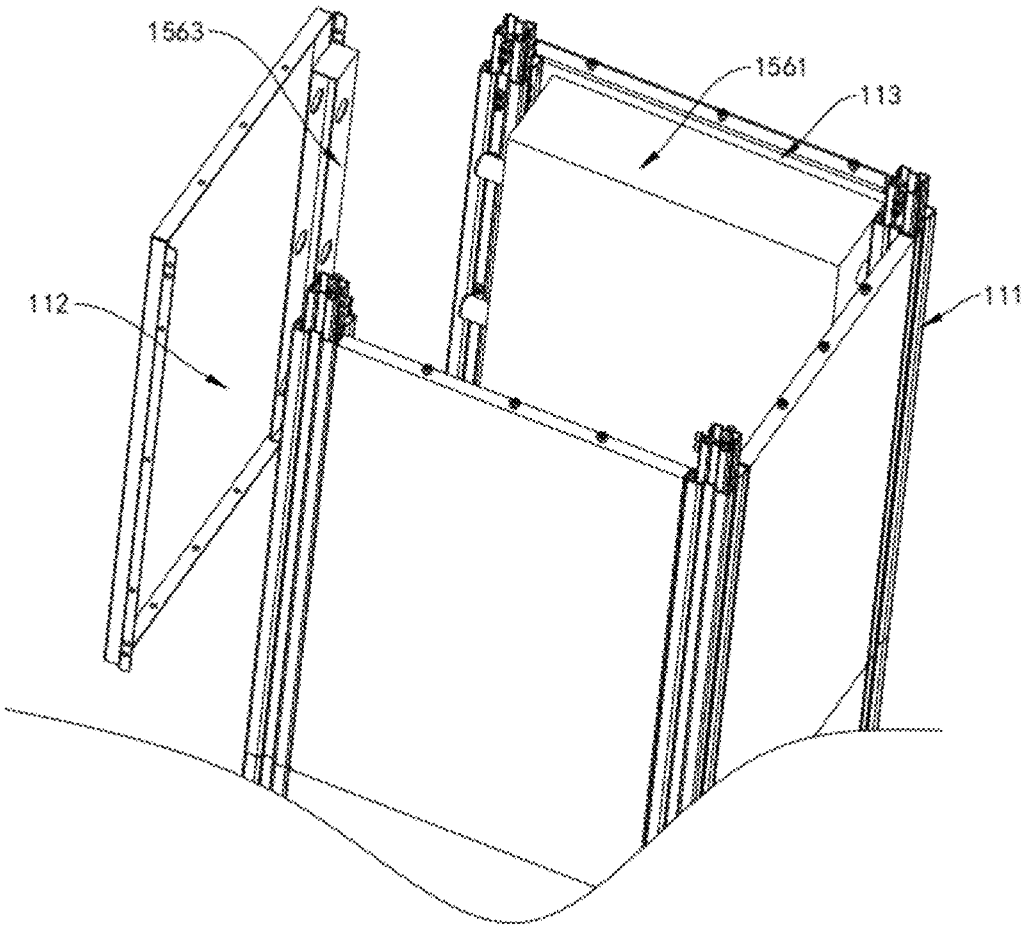
FIG. 12 is a schematic structural diagram of the latch slot of the detachable and combinable cabinet and its assembly method proposed by the invention.

In the embodiment, since the central unit cabinet 11 is located in a middle of the combinable cabinet 1, top and bottom of the first side panel 112 need to avoid the flanges at top and bottom of the second side panel 122; as a result, only both ends of the first side panel 112 are equipped with first flanges 114 to interface with the grooves 13; after the central unit cabinet 11 and the end unit cabinet 12 are connected, the second flanges 124 at the top and bottom of the second side panel 122 extend to an interior of the central unit cabinet 11, covering the connection area between the first side panels 112 and the second side panels 122. This not only further enhances the overall structural strength of the product but also significantly improves the cabinet's internal sealing, preventing dust from entering the cabinet through the connection area between the first side panels 112 and the second side panels 122. Referring to FIG. 5, the widths of the first flanges 114 and the second flanges 124 are designed to match the width of the grooves 13, ensuring stability when the first flanges 114 and second flanges 124 are inserted into the grooves 13. The assembly is further secured with screws, ensuring a stable connection between the first side panels 112, the second side panels 122, the first vertical profiles 111, and the second vertical profiles 121, eliminating any potential wobbling.

As a preferred technical solution of the invention, one end of the first door panel 113 is hinged to one side of one of the first vertical profiles 111 using a hinged part 14, one end of the second door panel 123 is hinged to one side of one of the second vertical profiles 121 using a hinged part 14, and the first door panel 113 and second door panel 123 are secured with screws.

In the embodiment, when the central unit cabinet 11 and the end unit cabinet 12 are combined and need to be used as a single unit, it only needs to secure connection area between the first door panel 113 and the second door panel 123 together by inserting screws. If the central unit cabinet 11 and the end unit cabinet 12 need to be used independently, it is not necessary to connect the first door panel 113 and the second door panel 123; instead, a door lock 156 is installed on each independently operable first door panel 113 and second door panel 123, allowing them to be locked separately.

As a preferred technical solution of the invention, both ends of the first door panel 113 are equipped with first edges 115, top and bottom of the first door panel 113 are equipped with first bends 116, the first edges 115 at both ends of the first door panel 113 are respectively inserted into grooves 13 of the first vertical profiles 111 at two ends of the first door panel 113; both ends of the second door panel 123 are equipped with second edges 125, top and bottom of the second door panel 123 are equipped with second bends 126, the second edges 125 at both ends of the second door panel 123 are respectively inserted into grooves 13 of the second vertical profiles 121 at two ends of the second door panel 123; the connection between the first door panel 113 and second door panel 123 is secured by fastening the first bends 116 and second bends 126 with screws.

In the embodiment, the grooves 13 accommodate and conceal edges of the first door panel 113 and the second door panel 123, ensuring that the concealed edges have no prying points. The positioning function of the grooves 13 also provides protection against prying and theft for the first door panel 113 and the second door panel 123, thereby ensuring the security of the combinable cabinet 1.

As a preferred technical solution of the invention, four corners at a bottom of the top panel 152 are welded with profile connectors 151; bottom ends of these profile connectors 151 at the bottom of the top panel 152 are inserted into an interior of uppermost second vertical profiles 121 and secured with the second vertical profiles 121 via screws; the top panel 152 is also secured to a top of the uppermost second side panels 122 with screws.

In the embodiment, the design of welding the top panel 152 to the profile connectors 151 ensures assembly stability of the top panel 152. After the profile connectors 151 at the bottom of the top panel 152 are fixed to the second vertical profiles 121, the flanges at the bottom of the top panel 152 are further secured to the flanges at a top of the second side panels 122 by inserting screws, enhancing the assembly stability of the top panel 152; additionally, the second flanges 124 at the top of the second side panel 122 extends into an interior of the top panel 152, ensuring the sealing of connection area between the second side panel 122 and the top panel 152.

As a preferred technical solution of the invention, the bottom panel 153 is secured to a bottom of lowermost second side panels 122 with screws; four corners of the bottom panel 153 are internally equipped with profile holes 154, and four profile holes 154 align with bottom ends of four lowermost second vertical profiles 121.

In the embodiment, after the bottom panel 153 is fixed to the second side panels 122 with screws, the second flanges 124 at the bottom of the second side panel 122 extend into an interior of the bottom panel 153, ensuring the sealing of connection area between the second side panels 122 and the bottom panel 153. The profile holes 154 are designed to accommodate support feet 155, facilitating the installation of the support feet 155.

As a preferred technical solution of the invention, the connecting components 15 also include support feet 155 and a door lock 156, the support feet 155 have the same shape as the profile connectors 151; top ends of the support feet 155 pass through the profile holes 154 and extend into the second vertical profiles 121; two sides of each support foot 155 are equipped with a plurality of height adjustment holes 1551, the support feet 155 are secured to the second vertical profiles 121 with screws through these height adjustment holes 1551; a bottom end of each support foot 155 is fixed with a support plate 157.

In the embodiment, the support feet 155 are inserted into an interior of the second vertical profiles 121 through the profile holes 154. The height of the support feet 155 can be adjusted using a plurality of height adjustment holes 1551. Once the adjustment is completed, screws are threaded into the corresponding height adjustment holes 1551 to secure the support feet 155 to the second vertical profiles 121.

As a preferred technical solution of the invention, the door lock 156 includes latch components 1561 positioned on both sides of the first door panel 113 and a latch control panel 1562, as well as a latch slot 1563 on one side of the first side panel 112 corresponding to a latch.

In the embodiment, after the first door panel 113 and the second door panel 123 are fixed together, only one door lock 156 needs to be installed on either the first door panel 113 or the second door panel 123. The specific installation position is determined based on the height of the combinable cabinet 1, primarily to facilitate user access. The door lock 156 can be an electronic lock or a conventional key lock. Through the latch control panel 1562, the latch inside the latch component 1561 can be disengaged from or engaged with the latch slot 1563 using a password or key, enabling locking and unlocking.

An assembly method for a detachable and combinable cabinet, comprising the following steps:

- step 1: assembling the central unit cabinet 11: first, screw holes are drilled into the first flanges 114 at both ends of the first side panels 112 and into two grooves 13 on the first vertical profiles 111 facing an interior of the cabinet; then, the first side panels 112 and the first vertical profiles 111 are fixed together by inserting screws through the screw holes; where screw holes are required, they can be created by installing rivet nuts in through holes.

- step 2: assembling the end unit cabinet 12: first, screw holes are drilled into the second flanges 124 at both ends of the second side panels 122 and into two grooves 13 on the second vertical profiles 121 facing the interior of the cabinet; then, the second side panels 122 and the second vertical profiles 121 are fixed together by inserting screws through the screw holes;
- step 3: assembling an upper part of the combinable cabinet: screw holes corresponding to the first vertical profiles 111 and second vertical profiles 121 are drilled into the profile connectors 151; the profile connectors 151 are inserted into the first vertical profiles 111 of the central unit cabinet 11 and the second vertical profiles 121 of the end unit cabinet 12, and then fixed by inserting screws through the screw holes, completing the connection between the first vertical profiles 111 and the second vertical profiles 121; next, screw holes are drilled into overlapping areas of the first side panels 112 and the second side panels 122, and screws are inserted to secure them;
- step 4: assembling a middle part of the combinable cabinet: four profile connectors 151 are welded to the bottom of the top panel 152, and bottom ends of the profile connectors 151 are inserted into the uppermost second vertical profiles 121 and fixed with screws; screw holes are drilled into flanges at the bottom of the top panel 152, and the top panel 152 is fixed to the top of the uppermost second side panel 122 by inserting screws through screw holes; screw holes are drilled into flanges at a top of the bottom panel 153, and the bottom panel 153 is fixed to the bottom of the lowermost second side panel 122 by inserting screws through screw holes; support feet 155 are installed inside the lowermost four second vertical profiles 121, and after adjusting height of the support feet 155, they are fixed to the second vertical profiles 121 by inserting screws through the height adjustment holes 1551.
- step 5: assembling a lower part of the combinable cabinet: the first door panel 113 and the second door panel 123 are installed on corresponding positions of the central unit cabinet 11 and the end unit cabinet 12 using hinges; screw holes are drilled into overlapping areas of the first bends 116 and second bends 126 on the installed first door panel 113 and second door panel 123, and screws are inserted to secure them; finally, the door lock 156 is installed on the central unit cabinet 11.

Based on the aforementioned assembly method, only a small number of central unit cabinets 11 and end unit cabinets 12 of specific heights need to be manufactured. By combining one or more central unit cabinets 11 and end unit cabinets 12, the the combinable cabinet 1 of various heights can be achieved. For example, the combinable cabinet 1 with heights of 1000, 600, 500, 400, and 300 can be combined with support feet 155 to create cabinets of almost any commonly used height.

In conclusion, the detachable and combinable cabinet and its assembly method feature a modular design for the central unit cabinets 11 and the end unit cabinets 12. This design allows for the combination of units with relatively few specifications to create cabinets of various heights or widths, significantly simplifying the manufacturing process and greatly reducing storage and packaging volume, which facilitates storage, transportation, and protection, saving on shipping costs. At the same time, it provides an excellent solution for the production, packaging, and transportation of extra-long, extra-wide, and oversized cabinets. Additionally, it eliminates the need for extensive welding and grinding processes traditionally required in cabinet manufacturing, protecting workers' health and the environment. This design offers strong practicality.

It should be noted that, in this document, terms such as "comprising," "including," or any other variations thereof are intended to cover non-exclusive inclusion. This means that a process, method, item, or device that includes a series of elements not only includes those elements but may also include other elements not explicitly listed or inherent to such a process, method, item, or device. Without further limitation, an element defined by the phrase "comprising one . . . " does not exclude the presence of additional identical elements in the process, method, item, or device that includes the said element.

Although embodiments of the present invention have been shown and described, those of ordinary skill in the art can understand that various changes, modifications, substitutions, and variations can be made to these embodiments without departing from the principles and spirit of the invention. The scope of the invention is defined by the appended claims and their equivalents.

The invention claimed is:

1. A detachable and combinable cabinet, comprising a combinable cabinet; the combinable cabinet includes a plurality of central unit cabinets, end unit cabinets, and connecting components used to assemble a plurality of central unit cabinets and end unit cabinets together; a plurality of the end unit cabinets are respectively positioned at top and bottom of the central unit cabinets;

each central unit cabinet comprises at least four first vertical profiles and three first side panels and a first door panel arranged between the four first vertical profiles;

each end unit cabinet comprises at least four second vertical profiles and three second side panels and a second door panel arranged between the four second vertical profiles;

the first vertical profiles and the second vertical profiles are structurally identical, with grooves provided on all four sides of the first vertical profiles and the second vertical profiles;

the connecting components include profile connectors, a top panel, and a bottom panel; the top panel is positioned at a top of the combinable cabinet, and the bottom panel is positioned at a bottom of the combinable cabinet;

the profile connectors are used to connect the first vertical profiles and second vertical profiles, as well as to connect the second vertical profiles and the top panel;

wherein both ends of the first door panel are equipped with first edges, top and bottom of the first door panel are equipped with first bends, the first edges at both ends of the first door panel are respectively inserted into grooves of the first vertical profiles at two ends of the first door panel; both ends of the second door panel are equipped with second edges, top and bottom of the second door panel are equipped with second bends, the second edges at both ends of the second door panel are respectively inserted into grooves of the second vertical profiles at two ends of the second door panel; the connection between the first door panel and second door panel is secured by fastening the first bends and second bends with screws.

2. The detachable and combinable cabinet of claim 1, wherein the profile connectors have the same shape as the first vertical profiles but are slightly smaller in both length and width than the internal dimensions of the first vertical profiles; interior of the first vertical profiles and second vertical profiles are sleeved with the profile connectors, the profile connectors being screwed to the first vertical profiles and second vertical profiles.

3. The detachable and combinable cabinet of claim 1, wherein a top, bottom, and both ends of each first side panel are equipped with first flanges, a top, bottom, and both ends of each second side panel are equipped with second flanges; the first flanges at both ends of the first side panels are respectively inserted into grooves of the first vertical profiles at both ends of the first side panels and secured with screws, the second flanges at both ends of the second side panels are respectively inserted into grooves of the second vertical profiles at both ends of the second side panels and secured with screws.

4. The detachable and combinable cabinet of claim 1, wherein one end of the first door panel is hinged to one side of one of the first vertical profiles using a hinged part, one end of the second door panel is hinged to one side of one of the second vertical profiles using a hinged part.

5. The detachable and combinable cabinet of claim 1, wherein four corners at a bottom of the top panel are welded with profile connectors; bottom ends of these profile connectors at the bottom of the top panel are inserted into an interior of uppermost second vertical profiles and secured with the second vertical profiles via screws; the top panel is also secured to a top of the uppermost second side panels with screws.

6. The detachable and combinable cabinet of claim 1, wherein the bottom panel is secured to a bottom of lowermost second side panels with screws; four corners of the bottom panel are internally equipped with profile holes, and four profile holes align with bottom ends of four lowermost second vertical profiles.

7. The detachable and combinable cabinet of claim 1, wherein the connecting components also include support feet and a door lock, the support feet have the same shape as the profile connectors; top ends of the support feet pass through the profile holes and extend into the second vertical profiles; two sides of each support foot are equipped with a plurality of height adjustment holes, the support feet are secured to the second vertical profiles with screws through these height adjustment holes; a bottom end of each support foot is fixed with a support plate.

8. The detachable and combinable cabinet of claim 7, wherein the door lock includes latch components positioned on both sides of the first door panel and a latch control panel, as well as a latch slot on one side of the first side panel corresponding to a latch.

9. An assembly method for a detachable and combinable cabinet of claim 1, comprising the following steps:

Step 1: assembling the central unit cabinet: first, screw holes are drilled into the first flanges at both ends of the first side panels and into two grooves on the first vertical profiles facing an interior of the cabinet; then, the first side panels and the first vertical profiles are fixed together by inserting screws through the screw holes;

Step 2: assembling the end unit cabinet: first, screw holes are drilled into the second flanges at both ends of the second side panels and into two grooves on the second vertical profiles facing the interior of the cabinet; then, the second side panels and the second vertical profiles are fixed together by inserting screws through the screw holes;

Step 3: assembling an upper part of the combinable cabinet: screw holes corresponding to the first vertical profiles and second vertical profiles are drilled into the profile connectors; the profile connectors are inserted into the first vertical profiles of the central unit cabinet and the second vertical profiles of the end unit cabinet, and then fixed by inserting screws through the screw holes, completing the connection between the first vertical profiles and the second vertical profiles; next, screw holes are drilled into overlapping areas of the first side panels and the second side panels, and screws are inserted to secure them;

Step 4: assembling a middle part of the combinable cabinet: four profile connectors are welded to the bottom of the top panel, and bottom ends of the profile connectors are inserted into the uppermost second vertical profiles and fixed with screws; screw holes are drilled into flanges at the bottom of the top panel, and the top panel is fixed to the top of the uppermost second side panel by inserting screws through screw holes; screw holes are drilled into flanges at a top of the bottom panel, and the bottom panel is fixed to the bottom of the lowermost second side panel by inserting screws through screw holes; support feet are installed inside the lowermost four second vertical profiles, and after adjusting height of the support feet, they are fixed to the second vertical profiles by inserting screws through the height adjustment holes;

Step 5: assembling a lower part of the combinable cabinet: the first door panel and the second door panel are installed on corresponding positions of the central unit cabinet and the end unit cabinet using hinges; screw holes are drilled into overlapping areas of the first bends and second bends on the installed first door panel and second door panel, and screws are inserted to secure them; finally, the door lock is installed on the central unit cabinet.

* * * * *